Feb. 19, 1946.   C. I. PLACE   2,395,193
PROPELLER ASSEMBLY
Filed April 24, 1944   3 Sheets-Sheet 1
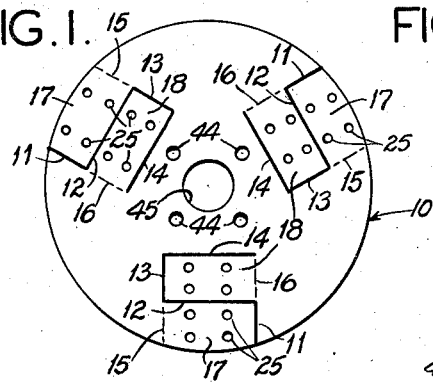
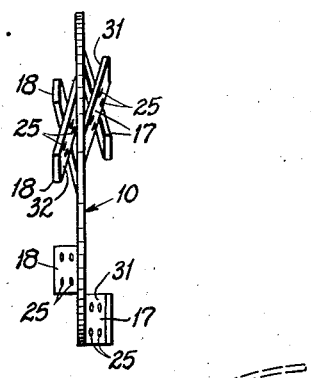
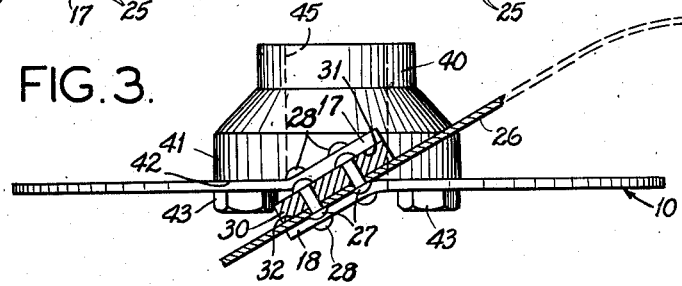
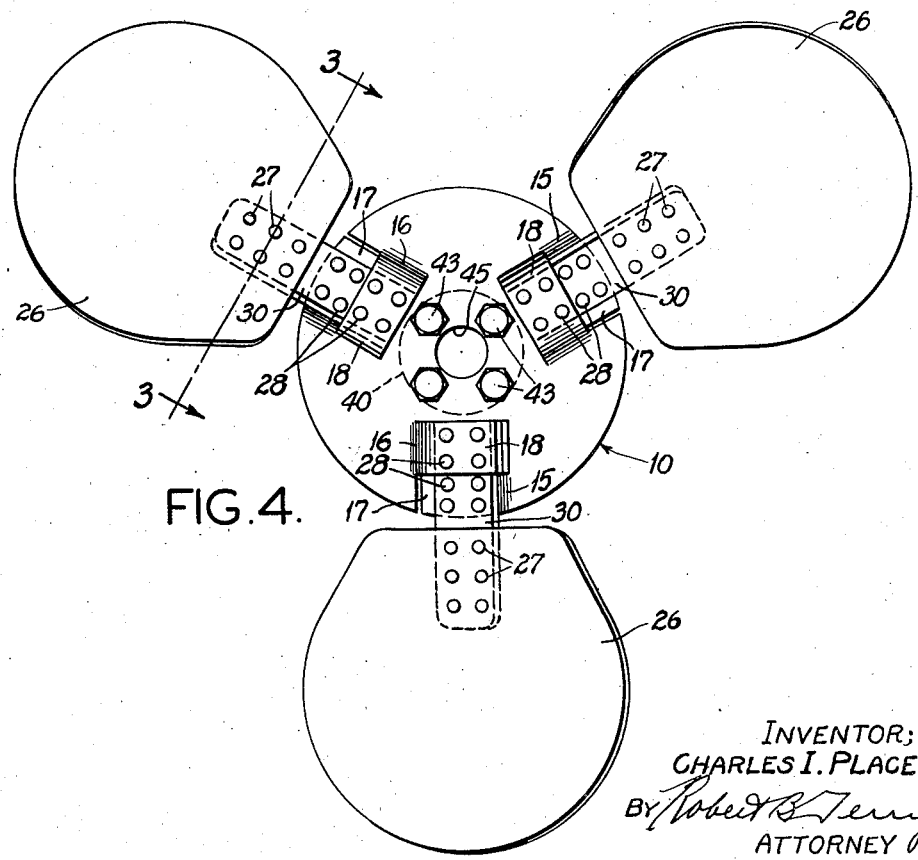
INVENTOR;
CHARLES I. PLACE
BY Robert B. Terry
ATTORNEY Feb. 19, 1946.  C. I. PLACE  2,395,193
PROPELLER ASSEMBLY
Filed April 24, 1944  3 Sheets-Sheet 2
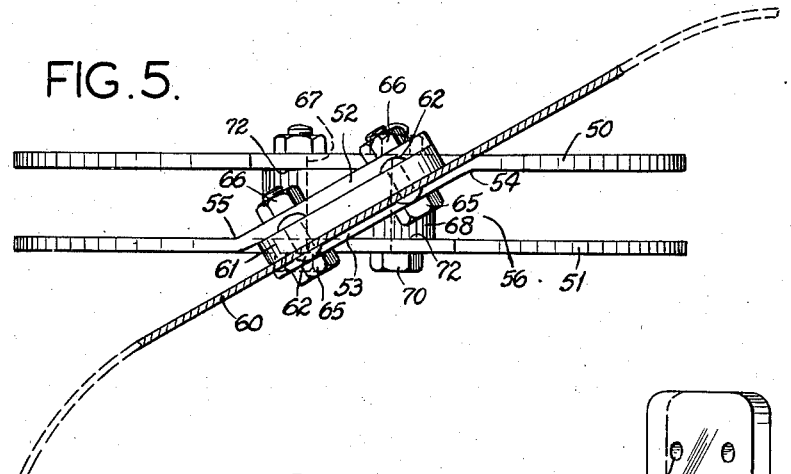
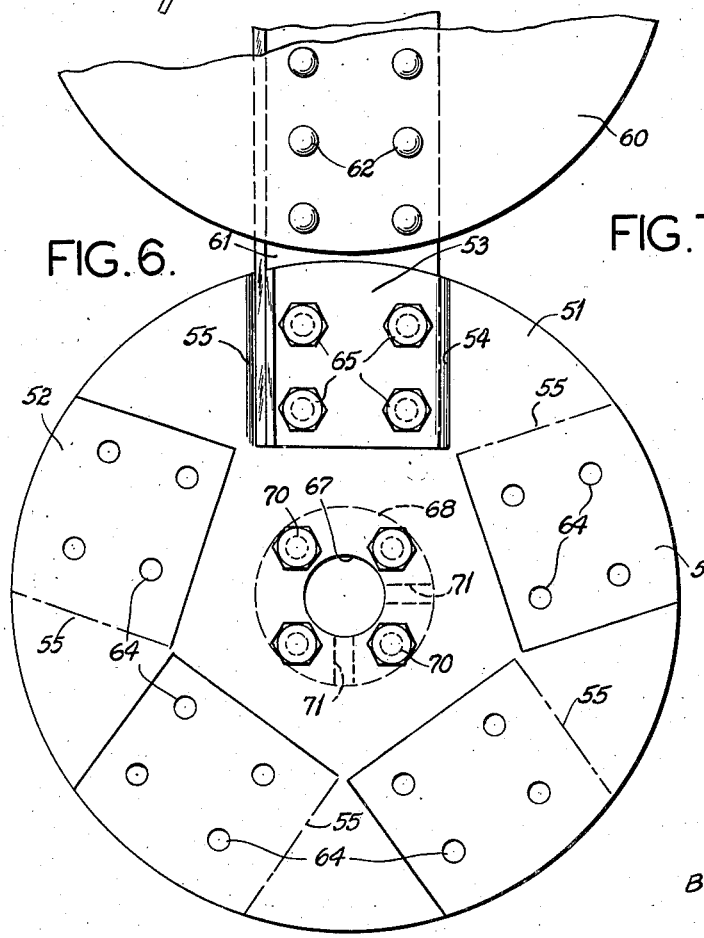
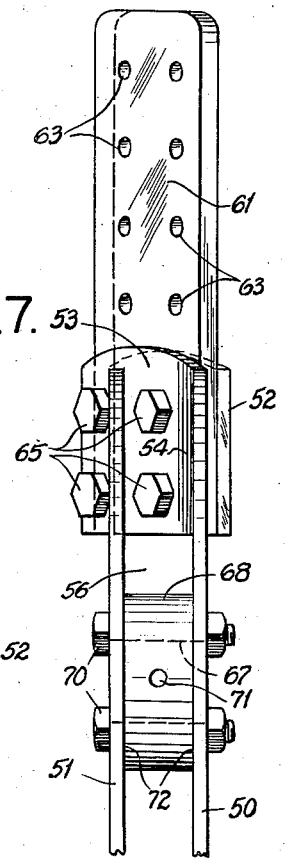
INVENTOR:
CHARLES I. PLACE
BY
ATTORNEY Feb. 19, 1946.   C. I. PLACE   2,395,193
PROPELLER ASSEMBLY
Filed April 24, 1944   3 Sheets-Sheet 3

INVENTOR:
CHARLES I. PLACE
BY Robert B. Terry
ATTORNEY

Patented Feb. 19, 1946

2,395,193

UNITED STATES PATENT OFFICE 2,395,193

PROPELLER ASSEMBLY

Charles I. Place, New Milford, Conn., assignor to The Torrington Manufacturing Co., Torrington, Conn., a corporation of Connecticut Application April 24, 1944, Serial No. 532,497

2 Claims. (Cl. 170—173)

This invention relates to improvements in propeller assemblies, and more particularly to an improved arrangement for mounting and imparting pitch to the several blades of a propeller type fan, or to other fluid reaction wheels of the same general type.

The improvements are particularly, but by no means exclusively applicable to heavy duty fluid displacement propellers, such as fans adapted for certain industrial uses, as heavy duty exhaust fans, and for other ventilating purposes.

In fans of the type to which the present improvements are more particularly applicable, certain difficulties have been encountered in usage, as reflected in occasional failures or breakage of elements, under extremely difficult operating conditions. Among the causes of some such failures, are developed zones of weakness in the blade mounting arms through which the individual blades are secured to a center plate or like element. The prevailing practice in forming up propeller fans is to impart blade pitch by means of a blade arm which, even if of rugged or heavy construction, is usually torsionally deformed, so that its blade supporting end will lie at a pitch angle to the opposite or supported end of the arm. Such torsional deformation, irrespective of how imparted to the blade arm, may at times result in pronounced zones of weakness in the assembly. Accordingly the present invention has as a major object, a structure which, while requiring a minimum of tooling equipment and special tooling operations and which may be produced throughout of standard and normally readily obtainable stock materials, nevertheless serves fully to obviate the difficulties noted.

A further and important object of the invention is attained in an improved mounting for the blades and blade arms of a propeller type fan, wherein blade pitch is or may be imparted to the blade through a specially formed center plate structure.

Yet another object of the invention is attained in a novel center plate body or assembly in which, partly by specially formed portions of one or more plates making up this assembly, and partly by the angular relation between such plates, each of the several blades of the propeller is securely and permanently positioned in fixed angular relation in the fan and at a fixed pitch angle to the plane of fan revolution.

Yet another object of the invention is attained in an improved assembly of blade and blade arm, in which neither blade nor arm need be torsionally deformed in any manner to impart pitch thereto.

A still further object of the invention is attained in an arrangement such as to lend itself to the use of a planar blade arm of undeformed or unpitched shaping, thus enabling, if desired, the use of a short length of standard steel flat or bar stock or the like, as a blade arm.

The present application is a companion to, and is filed concurrently with a copending application of Addison W. Evans, bearing Serial No. 532,512, filed April 24, 1944, and entitled "Improvements in fluid propellers." In the structure exemplifying the improvements of the said Evans application, although it offers many marked advantages over the prior art particularly in heavy duty fans, it is nevertheless subject to certain disadvantages, among which is the fact that the outturned wing elements project at an acute angle outwardly from the center plate structure, resulting in a drag loss in zones just inwardly of the periphery of the center plate. The present improvements in certain forms serve to obviate this difficulty entirely. Further, the structure characterizing the Evans application aforesaid either requires blades of greater area than those of the present improvements or, conversely stated, will serve to mask some of the blade area where same is employed for purposes of securement to the center disc structure. The structures within the intendment and scope of the present application, and those similarly comprehended by the Evans application, each presents certain advantages and certain disadvantages in respect to the other, selection being made somewhat according to nature, size, and operating conditions for which the propeller is intended.

The foregoing and numerous other objectives will more clearly appear from a consideration of the following detailed description of a few selected embodiments of the present improvements, taken in connection with the accompanying drawings, in which:

Fig. 1 is a face or plan view of a formed center disc suitable for making one embodiment of the present improvements;

Fig. 2 is an edgewise view of the disc shown by Fig. 1;

Fig. 3 is a sectional elevation looking inwardly along the radius of the assembled propeller, specifically as taken along line 3—3 of Fig. 4;

Fig. 4 is a front elevation or face view of the delivery side of a three blade fan;

Fig. 5 is a sectional elevation of a slightly modified form of propeller fan embodying present improvements, this figure of drawing being taken along a line normal to a radius and looking inwardly along a radius coincident with one of the blade arms;

Fig. 6 is a front elevation of the center plate structure of a five blade propeller showing one of the blade arms assembled, and a fragmentary portion of a blade thereon;

Fig. 7 is a fragmentary elevational view of the structure shown by Fig. 6, as same would appear when viewed edgewise of this partial assembly, Fig. 7 being taken at a right angle to the showing of Fig. 6;

Figure 8:
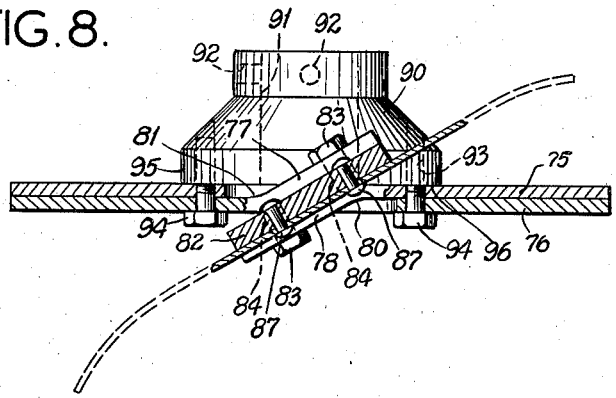
Fig. 8 is an irregular section, showing certain parts in elevation, of a still further slightly modified form of fan embodying present improvements, Fig. 8 being taken along line 8—8 of Fig. 9.

Proceeding now to a description of the construction in accordance with Figs. 1, 2, 3 and 4, there is shown by these figures an arrangement which exemplifies the present invention in probably its most simple structural embodiment, in that there is required to constitute the center body or center disc structure, only a single plate element generally indicated at 10. This single plate is preferably formed of a relatively heavy gauge sheet steel or plate stock as a preference for economy in selection of materials, although other ferrous and non-ferrous metals or other materials may equally well be employed under certain conditions.

In the formation of the preferably but not necessarily circular plate 10, the plate is incised as by cutting, piercing or slotting in each of the angular zones of blade mounting, along a plurality of rectilinear lines, these being indicated by the solid lines of incision in Fig. 1, and including a first incision 11 extending inwardly of the periphery of the disc, parallel to but offset from a radius, if, as is presupposed, a radial blade arm mounting is desired. Connecting with the incision 11, and of a trend chordwise of the plate, is a second incision 12 with which connects a third incision 13 parallel to the cut 11 above described, but spaced therefrom. The cut 13 in turn connects with a second chordwise incision 14 parallel to the cut 12 but disposed radially inwardly thereof. As a preference in the example shown, each of the two partly rectangular portions may be regarded as further bounded by relatively oppositely disposed fold lines 15 and 16. The fold lines represent zones along which the areas now defined by the lines 11, 12, 13 and 14 are bent outwardly of the plane of the disc 10, as will appear in Fig. 2, to result in outstruck portions in the nature of flaps or wings 17 and 18. Each of these now projected portions may be pierced or drilled to provide a suitable number of apertures 25 for the reception of rivets or equivalent attachment elements. The structure thus far described as to nature and formation of the elements 17 and 18, applies equally to each of the angular blade arm zones, hence a description of one thereof will serve for all.

Without limitation as to number of blades, the particular structure illustrated shows a three-blade fan in which the blades 26 are of substantial width in proportion to their length along a radius on the axis of revolution. The blades may be secured in assembly, as may be blade arms, by a suitable plurality of rivets 27, shown as six for a heavy duty fan, serving to attach each blade to its blade arm, and rivets 28 employed in attachment of the blade arm to the center disc.

Since the present improvements are particularly, although by no means exclusively, adapted to heavy duty industrial or exhaust fans of substantial diameters, a preferred form of blade arm will now be described: As will best appear from Fig. 4, each of the arms 30 is preferably of a heavy gauge flat bar or strip stock; each such arm is further of planar aspect, and by great preference characterized by an absence of torsional deformation, which feature will be at times referred to as an unpitched arm. It has been common practice in the fan industry for a number of years to impart the desired pitch angle to the blades of a propeller by imparting the necessary twist through torsional deformation, or through a similar initial formation of the blade arms, this practice resulting in zones of weakness with some occurrence of fatigue and breakage in the blade arms. This shortcoming is obviated by the described practice of imparting blade pitch solely or substantially through the construction of the center plate, specifically the formed wing portions 17 and 18 thereof.

It will now have become apparent that assembly of blades 26 to arms 30 may involve only a conventional riveting operation, although it will of course be understood that screws, bolts or the like may, if desired, be employed, or that the component parts of the assembly may be welded. Assuming now the blade arms to be assembled to the blades and projected radially inwardly thereof, it will have been noted that the paired wings, flaps or outstruck portions 17 and 18 in each blade mounting zone, are struck outwardly of the plane of the center body, but in opposite directions, at about equal angles, and by preference, each at about the desired pitch angle as noted. Accordingly, the spacing on opposite sides of a radius of the incisions 11 and 13, is selected in accordance with the thickness or gauge of blade arms. From this it results that there is presented depthwise and along the radius in each blade zone, a distinct recess resulting from the opposite parallel spaced inner faces 31 and 32 of the wing-like portions 17 and 18. It now appears that the opposed planar faces partly bounding this recess will mate with the opposite planar surfaces of the blade arm extended therebetween, thus resulting in a rugged, extremely substantial and long-life assembly of blade arms to center plate, the arrangement being such that each arm is securely gripped between the paired wings, and is positively held in its initially assembled relation in the fan, in a manner to resist any structural disturbances which might otherwise be caused by prolonged vibration, pressure effects, or centrifugal stresses.

Completion of the assembly ready for shaft-mounting the fan and placing same in service, consists in affixing a suitable hub structure centrally of the disc 10, a preferred form of hub being indicated at 40, and which may be securely affixed for rotation with the shaft (not shown) either by key, set screw, or other form of shaft securement. It is preferred to utilize in heavy duty fans, a hub structure characterized by a somewhat enlarged head 41 provided with a planar face 42, inwardly of which is a series, for example four, tapped openings (not shown) each serving to receive one of the cap screws 43 extended through suitable openings 44 therefor in the center plate, the latter being provided with a center shaft opening 45 to permit the shaft to extend through the plate if desired.

A minor modification, consisting of a logical extension of the principles of construction heretofore discussed in detail, is shown by Figs. 5, 6 and 7. There is employed as a center disc structure or center body, a pair of parallel plates 50 and 51 which are assembled in spaced parallelism as hereinafter described. Each of the plates is formed in each angular blade zone to provide one or more, preferably only a single outstruck flap or wing shown at 52 on the plate 51, and indicated at 53 in the plate 50, it being noted that the fold lines 54 on plate 50 and 55 on plate 51 are distinctly out of register. It is further seen in this structure that as a preference each of the wings 50 and 53, while turned out of the plane of their respective plates preferably at about the desired pitch angle of blade, is projected inwardly of the space 56 between the two plates 50 and 51. In this manner it will be seen that each wing serves in assembly somewhat after the manner of a bridge piece between the two axially spaced plates 50 and 51.

In the present, as in other modifications, it is a preference to utilize as a blade arm, a length of bar or strip stock of relatively heavy gauge preferably of considerably greater thickness than the material constituting each of the blades 60, of which five are provided for in the present structure, although any reasonable number of blades may be employed. The blade carrying arm 61 in each angular blade zone, may be assembled to the associated blade as by rivets 62, by welding or any other suitable securement expedient. When securement elements such as rivets are employed, the blade arm is provided with a plurality of rivet openings 63 for blade attachment, and with similar openings (not shown) for securement of each blade arm to the wings 52—53 of the center body. These latter may also be pierced, drilled or otherwise perforated as indicated at 64 for the reception of holding elements in this zone, shown as a plurality of bolts 65, four in number for each blade arm, and provided with nuts 66.

As in foregoing examples, assembly of the fan consists, after formation to attain the features thus far described, but without limitation as to sequence of steps, in securing each of the several blades 60 (only one being shown) to the associated blade arm 61; assembling the two plates 50 and 51 of the center body in a relatively reverse or back-to-back arrangement and suitably axially spaced as determined. In fans of not too great a diameter, the assembly of the plates 50 and 51 in a manner to fix their axial spacing, as well as to maintain the plates in true parallelism, may be accomplished by the provision of a combined hub and plate spacer indicated at 68, and provided with a central shaft opening 67, also provided with a series, shown as four, of bolt openings parallel to the axis and which serve to receive the four hub and plate securement bolts 70. The hub 68 is provided with tapped passages 71 for reception of set screws, or with a keyway (not shown) as may be desired.

The construction just described is in many respects commercially preferable to others herein disclosed, one reason for this preference being the fact that, while the wings or flaps 52 and 53 serve of themselves and by reason of their particular angular disposition, to impart pitch to the rectilinear flat-side blade arm 61, the extension of the wings into the space 56 serves markedly to minimize the parasitic losses resulting from drag in the region of the center plate, otherwise resulting in those structures wherein the wings project outwardly, rather than inwardly of the center plate structure. As will best appear from Fig. 5, the wings 25—53 need project very little if any, outwardly of the outermost plane faces of the discs 50 and 51.

In the structure described, it is a preference to grind the opposite front and rear faces of the hub 68 or otherwise to assure the parallelism of these faces, particularly in case no separate plate spacers are employed. It will be noted particularly from Fig. 7 that in assembly, these opposite faces 72 of the hub 68 thus serve definitely and permanently to maintain not only the spacing, but the parallelism of the plates.

Figure 9:
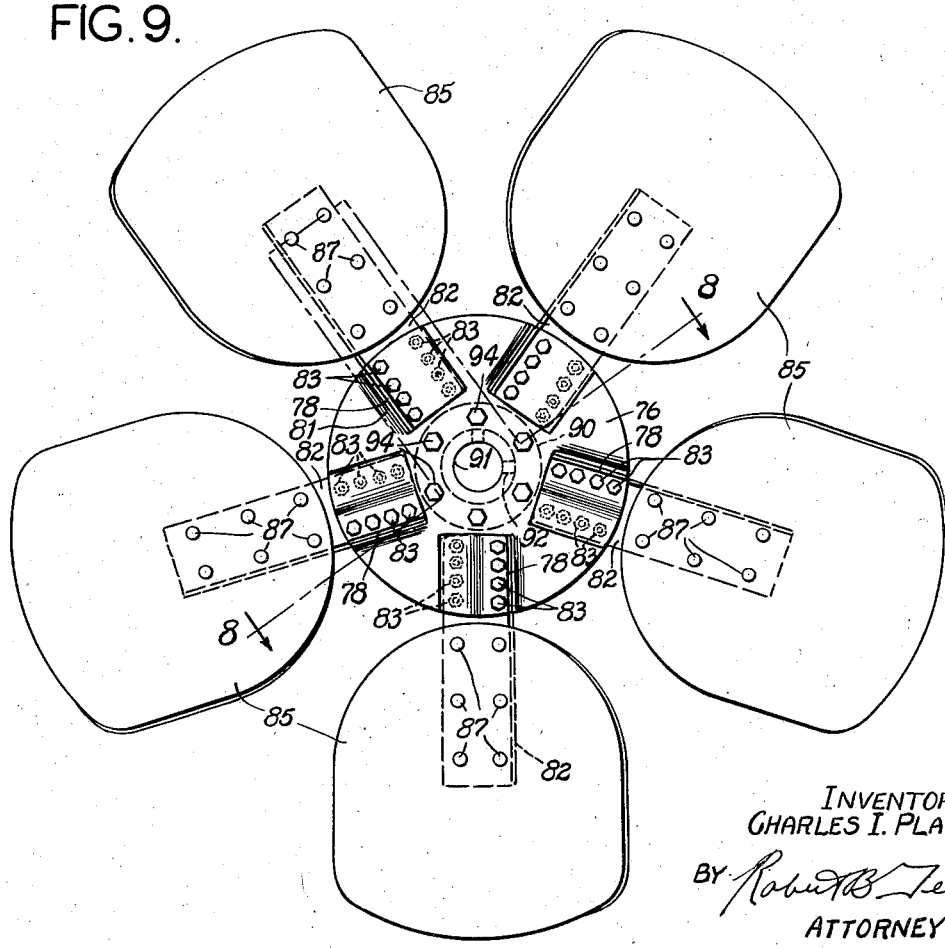
Fig. 9 is a front or face view of the delivery side of a five blade fan embodying the blade mounting structure of Fig. 8.

A further minor modification employing a pair of adjacent plate elements to constitute the center body or center plate structure, will be noted in Figs. 8 and 9. This arrangement utilizes a pair of plates 75 and 76 each formed in each angular blade supporting zone, with a wing or flap 77 on plate 76 and the companion plate 75 being similarly provided with an outstruck portion 78. The plates, as in modifications earlier described, are arranged in a back to back, preferably contiguous relation, each of the wings being characterized as before by a fold line 80 for wing 78, and fold 81 for wing 77, the assembly of plates being such that these fold lines are out of register, being angularly shifted so as to provide the requisite spacing between the paired or companion wings 77 and 78 for reception therebetween of a blade arm 82. The blade arm, as in examples earlier described, is clampingly held or gripped between the paired blade arms as by a plurality of attachment elements exemplified by cap screws 83, four of which are shown as extended through a comparable number of openings therefor (not shown) in each wing, and engaging tapped recesses 84 in suitable number in each arm.

Each of the blades 85 is or may be as shown, of substantial width, thus constituting a wide-blade type of fan. Although the assembly of Fig. 9 illustrates a five-blade fan, the improvements lend themselves equally to the use of any desired reasonable number of blades.

As in other structures heretofore described, each of the blade arms 82 preferably consists of a heavy gauge length of bar or strip stock preferably rectangular in face outline as well as in cross section, although this shaping may obviously be modified as desired. Securement of each blade to its associated blade arm 82 may be effected by welding, or as shown, by rivets 87 in the heavy duty fan shown by Fig. 9.

In the arrangement of Figs. 8 and 9 the plates 75 and 76 are so assembled that the wings of each plate, while deformed or outstruck at an angle from which results the pitch angle of the blade, each such wing also extends depthwise into and may extend through the opening resulting from the wing formation of the companion plate. In this manner, as in preceding examples, there results what may be termed a recess extending depthwise and preferably along a radius, from the periphery of the center body inwardly thereof. This recess may be regarded as identified with the space between the paired wings 77 and 78.

Although the plates 75 and 76 may be firmly assembled in adjacence in this form of structure by any suitable means either centrally or somewhat outwardly thereof, a rugged and substantial provision for this purpose, which cares as well for shaft mounting of the assembly, appears in a hub 90. The hub is provided with a shaft receiving bore 91, tapped set screw openings 92 where desired, or a keyway (not shown) and with a plurality (shown as six) of tapped apertures 93, for the reception of screws 94. The angularly spaced apertures or recesses 93 are preferably formed in an enlarged head portion 95 of the hub, which is provided with a planar face 96, which should be ground or otherwise closely formed to assure true running and parallelism of the plates 75 and 76.

As in examples earlier described, it will have appeared that the present arrangement in which each of the paired wings 77 and 78 extends depthwise through the wing openings, resulting in the companion center plate, serves to minimize any drag which might otherwise result from more extensive projection of the wings from the outside faces of the center body or structure. As in preceding examples also, it will be noted that in this construction, blade pitch is imparted entirely by the outstruck wings of the plates and the firm clamping securement of the blade arm between each pair of wings.

The foregoing description has related in detail to only a few of the numerous structural possibilities of the present improvements. Although the invention has been described by making detailed reference to selected examples, the detail of description is to be understood as illustrative of, and not as limiting the invention. Accordingly the claims, but for restrictions necessarily imposed by any prior art, are to be given their broadest interpretation.

I claim as my invention:

1. A heavy duty propeller type fan including a plurality of sheet metal blades, a blade arm for each of said blades, characterized by an absence of the torsional deformation of the arm between its ends, a center plate structure consisting of a pair of substantially planar sheet metal elements of substantial gauge, each characterized by an incision inwardly from the plate periphery and offset from a radius on the axis of revolution and bent along a linear fold line parallel to said incision, the center plates being axially spaced from each other and being incised and folded in each of the regions adjacent the several blade arms, with the resulting wings of each of the plates extended inwardly of the space resulting from the axial spacing of the plates, and the wings of the respective plates being spaced substantially equal to the thickness of the blade arm, and a hub to which the paired center plates are secured in axially spaced relation and by which the fan is adapted for rotative mounting on a shaft.

2. A heavy duty propeller type fan including a plurality of sheet metal blades, a blade arm for each of said blades, characterized throughout its length by opposite parallel flat faces and further characterized by an absence of torsional deformation of the arm between its ends, a center plate structure consisting of a pair of substantially planar sheet metal elements of substantial gauge, each characterized by an incision extending rectilinearly inwardly from the plate periphery and offset from a radius on the axis of revolution and bent at an angle conforming substantially to the desired pitch angle of the blade, along a linear fold line parallel to said incision, the center plates being axially spaced from each other and being incised and folded in each of the regions adjacent the several blade arms, with the resulting wings of each of the plates extended inwardly of the space resulting from the axial spacing of the plates, the width of each of the wings conforming substantially to the width of the blade arm to be engaged thereby, and the wings of the respective plates being spaced substantially equal to the thickness of the blade arm, and a hub to which the paired center plates are secured in axially spaced relation and by which the fan is adapted for rotative mounting on a shaft.

CHARLES I. PLACE.